(12) United States Patent
De Vogel

(10) Patent No.: US 6,216,144 B1
(45) Date of Patent: *Apr. 10, 2001

(54) DATA PROCESSING SYSTEM WITH MEANS FOR DISPLAY OF REDUCED IMAGES AND METHOD FOR THE REDUCTION OF IMAGES

(75) Inventor: Robert De Vogel, Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,430

(22) Filed: May 8, 1995

Related U.S. Application Data

(63) Continuation of application No. 08/166,802, filed on Dec. 14, 1993, now abandoned, which is a continuation of application No. 07/907,416, filed on Jul. 1, 1992, now abandoned.

(30) Foreign Application Priority Data

Jul. 5, 1991 (EP) .................................. 91201741

(51) Int. Cl.$^7$ ...................................... G06F 3/14
(52) U.S. Cl. ........................................ 707/526; 707/501
(58) Field of Search ............................. 707/3, 104, 501, 707/526; 345/348, 350

(56) References Cited

U.S. PATENT DOCUMENTS

| | | | |
|---|---|---|---|
| 4,153,896 | 5/1979 | White ................................... 340/731 |
| 4,445,137 | * 4/1984 | Panofsky .............................. 358/101 |
| 4,649,380 | * 3/1987 | Penna ................................... 340/750 |
| 4,885,786 | * 12/1989 | Anderson et al. ...................... 382/47 |
| 4,970,604 | * 11/1990 | Coueignoux .......................... 358/426 |
| 5,029,107 | * 7/1991 | Lee ....................................... 395/145 |
| 5,097,518 | * 3/1992 | Scott et al. ............................. 382/47 |
| 5,129,011 | * 7/1992 | Nishikawa et al. .................... 382/173 |
| 5,274,759 | * 12/1993 | Yoshioka .............................. 395/139 |
| 5,313,572 | * 5/1994 | Yamamoto et al. .................. 358/403 |
| 5,781,175 | * 7/1998 | Hara ..................................... 345/127 |

FOREIGN PATENT DOCUMENTS

| | | |
|---|---|---|
| 0105707 | 4/1984 | (EP) . |
| 8911694 | 5/1989 | (WO) . |
| 8911695 | 5/1989 | (WO) . |

OTHER PUBLICATIONS

Lacroix, "The Primary Raster: a Multiresolution Image Description", Proceedings of 10th International Conference on Pattern Recognition, 1990, vol. 1, pp. 903–907.*

Radha et al., "A Multiresolution approach to binary tree representations of images", International Conference on Acoustics, Speech, and Signal Processing, 1991, vol. 4, pp. 2653–2656.*

* cited by examiner

Primary Examiner—Stephen S. Hong
(74) Attorney, Agent, or Firm—Peter Verdonk

(57) ABSTRACT

In a data processing system a large number of reduced images of documents are shown simultaneously on the screen of a visual display unit. The images are reduced in a two-step process. The first step includes performing a run-length algorithm on an original image to obtain an intermediate image with a predetermined linear reduction. In the second step, blocks of pixels of the intermediate image are replaced by single pixel of a reduced image to obtain further linear reduction. The pixels in the reduced image are assigned a grey level or color which depends on the distribution of pixels in the block of pixels in the intermediate image.

8 Claims, 2 Drawing Sheets

Figure 1:
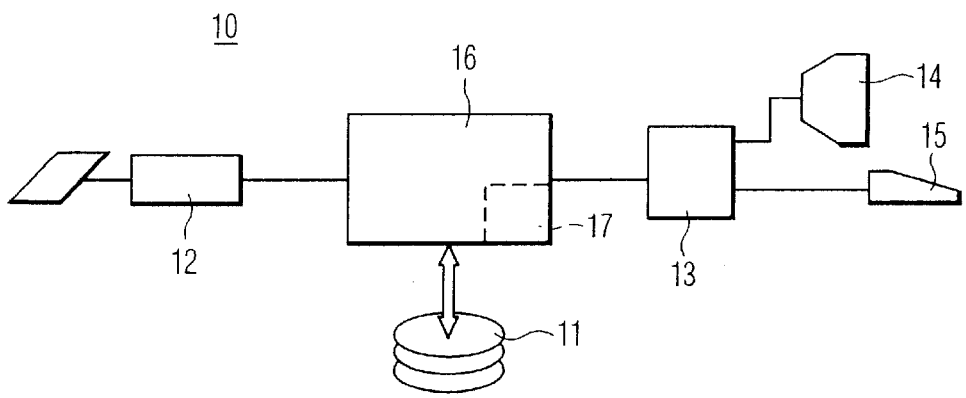

DATA PROCESSING SYSTEM WITH MEANS FOR DISPLAY OF REDUCED IMAGES AND METHOD FOR THE REDUCTION OF IMAGES

This is a continuation of application Ser. No. 08/166,802, filed on Dec. 14, 1993, which is a continuation of application Ser. No. 07/907,416, filed on Jul. 1, 1992, both now abandoned.

The invention relates to a data processing system comprising a visual display unit (VDU) of the raster type with a plurality of rasterpoints and comprising means for generating reduced images for display on the VDU from an original image available as an original set of pixel values, in which reduced images portions of the original image are represented by single pixels. Such a data processing system is for example used in an office environment were files, each consisting of a number of pages, are handled. The number of pages in a file may become pretty large, and reach, for example, several hundreds. In such an environment it is necessary to obtain an impression of the kind of documents and of the file by browsing through file contents without the need to see each individual page in a size that is sufficiently large to read. Only when a particular page, or a set of pages needs to be read or annotated, or the text on it changed, a full size copy of the page or the text is made available to the user of the system.

Such a data processing system is known from WO 89/11695. In the known data processing system pages from files or documents are presented in reduced format on a visual display unit (VDU). From an original image available as a set of original pixel values, for example a page of text scanned by an image digitizer, a reduced image is generated by subdivision of the original image in blocks of pixels and representing each such block by a single pixel in the reduced image. To determine the pixel values for this reduced image the average pixel value in the original block is taken into account supplemented with a contrast enhancement procedure. The pixel value of each pixel in the reduced image is determined not only from the average pixel value in the original block, but also in relation to the pixel values in the adjacent blocks.

A reduction with a linear factor of eight is described in WO 89/11695 as giving acceptable results. However a significant further reduction will be difficult to achieve because by such a further reduction of, for example, a page of text, the necessary block size will become larger and the averaged pixel values will become approximately the same, which will result in a reduced image in which all pixels, or a very large majority of them have the same, or approximately the same, pixel value. No details of the lay-out of such a reduced page are distinguishable any more and the user of the system is unable to recognize pages as being of particular interest or of no interest at the moment for him/her. A smaller reduction is then necessary but that inhibits the possibility to obtain in one glance an impression of a large number of pages of a file or document, and thereby of the kind of file.

It is, inter alia, an object of the invention to provide a data processing system in which the user can get a feeling of the contents of a file or a document by the display of all pages in the file or a large number of them in the form of extremely reduced images.

It is also an object of the invention to provide a method for generating an image in reduced format, in particular of a page of text, whereby the lay-out of the page of text is sufficiently recognizable to identify the type of page from the reduced image.

It is a further object of the invention to provide a method for display of a large number of pages of text from a document or file whereby an impression of the type of document or file can be obtained in one glance to a large number of reduced images.

To obtain the necessarily (extremely) reduced images in a way that allows recognition of the type or lay-out of each page the data processing system according to the invention is characterized in that the means for generating reduced images comprise image reduction means for determining a greylevel or colour to be assigned to pixels in the reduced image as a function of a pattern of pixel values in the portion of the original image to be represented by single pixels in the reduced image, in that each rasterpoint of the VDU is adjustable to one of a plurality of greylevels or colours and in that each pixel in the reduced image in the displayed reduced image is shown by one rasterpoint of the VDU. The reduced images are displayed on a screen that allows various intensities for each pixel. The reduction algorithm determines the greylevels in the reduced image in dependence of the configuration of pixel values in the portions of the original image corresponding to each pixel in the reduced image, not only on the basis of the average pixel value. By use of a suitable way of coding sufficient detail of the lay-out of a page can be retained in the reduction procedure.

Preferably the data processing system according to the invention is further characterised in that the image reduction means comprise first processing means for reducing the original image to an intermediate image and second processing means for reducing an intermediate image to the reduced image wherein the second processing means are arranged for determining greylevels or colours of pixels in the reduced image while incorporating the configuration of pixel values in the portions of the intermediate image to be represented by said pixels in the reduced image. To obtain significant reduction each pixel in the reduced image has to correspond to a relatively large block of pixels in the original image. Even if the pixels of the original image can adopt only one of two values, white—or "on"—and black—or "off"—the number of possible patterns in that block of pixels becomes soon very large and, consequently, the analysis of the pattern becomes cumbersome and time-consuming. By splitting of the reduction procedure in two steps the analysis of the blocks of pixels of the original image to obtain one pixel of the reduced image can be done very rapidly.

To this effect a data processing system according to the invention may be characterised in the second processing means is provided with a look-up table of possible configurations of pixel values for determining the greylevel or colour of a single pixel in the reduced image from the configuration of pixel values in a portion of the intermediate image. When there is only a restricted number of different configurations possible for each block of pixels in the intermediate image the use of a look-up table is a very fast way of translating the configuration into a pixel value of the reduced image while at the same time no excessive memory requirements are necessary.

An embodiment of the data processing system according to the invention is characterised in the second processing means are arranged for representing a block of three by three pixels (1–9) in the intermediate image by one pixel in the reduced image. Such a reduction puts moderate requirements to the available resources for calculating the pixel value or storing a table of configurations. For example, there are only $2^9$=512 black/white configurations for such a block and a corresponding number of entries in a look-up table.

Also a four by four block, with $2^{16}$=65536 possible black and white configurations would not impose an impossible burden on the data processing system in view of the present-day costs for memory capacity.

To obtain the intermediate image from the original image the data processing system according to the invention is characterised in that the first processing means are arranged for generating the pixels in the intermediate image by run-length coding of the pixels of the original image. It has appeared that such a reduction algorithm achieves considerable reduction without losing to much detail in the global lay-out of a page. A reduction with a factor of about twenty is possible.

These and other, more detailed, aspects of the invention will be apparent from and elucidated with reference to the drawings and embodiments described hereinafter.

The drawings illustrate in

Figure 2:
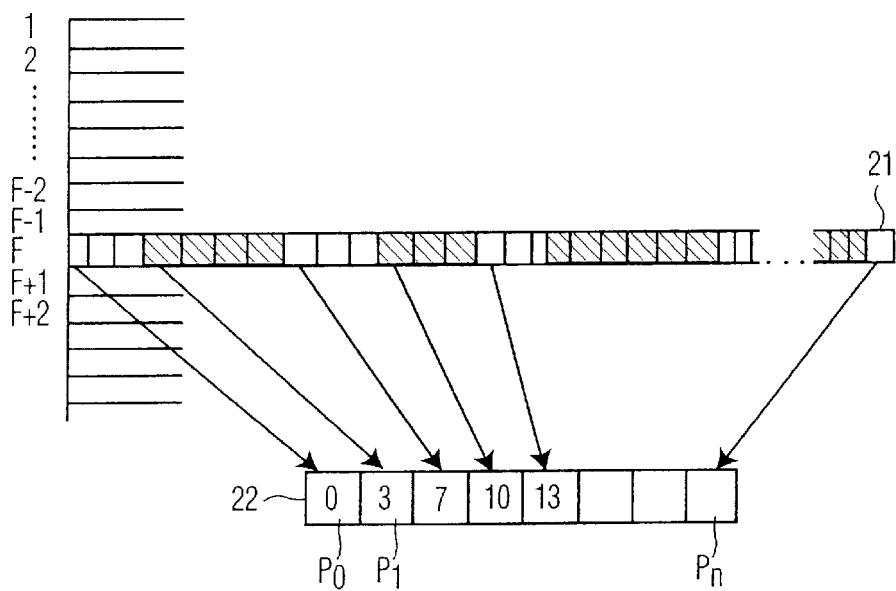
Figure 3:
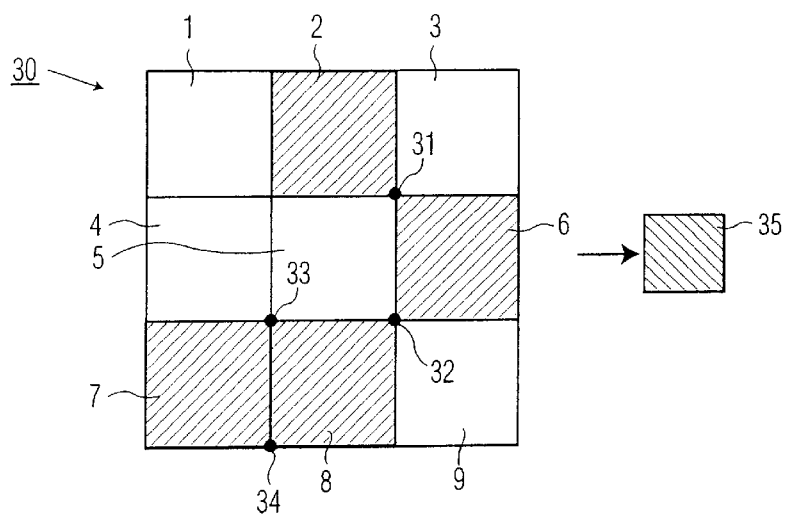
Figure 4:
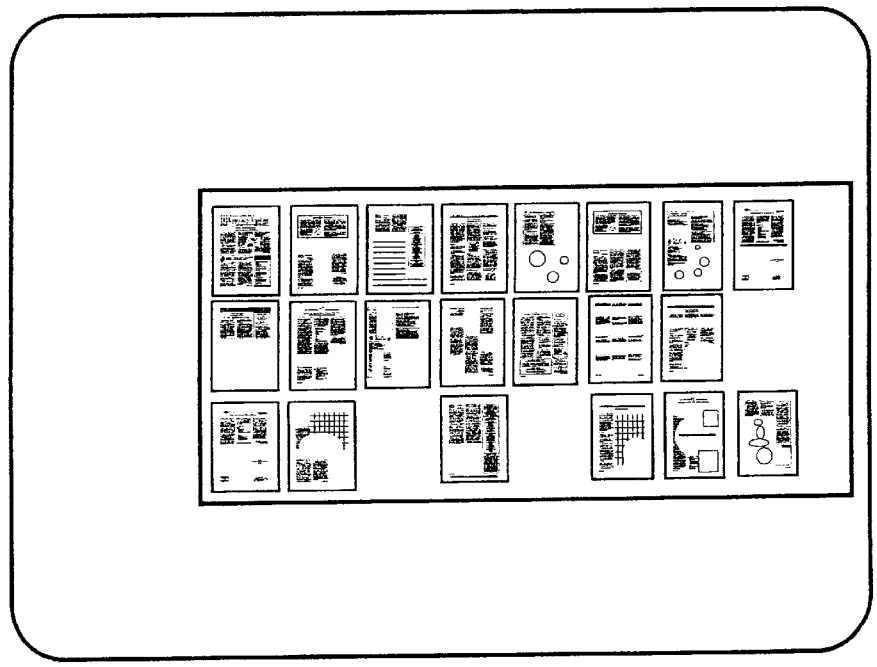

FIG. 1 diagrammatically a data processing system;

FIG. 2 a run length coding for reduction of the original set of pixels to an intermediate set of pixels;

FIG. 3 a further reduction of a set of pixels from the intermediate image to the reduced image;

FIG. 4 the display of several images as made visible on a VDU.

In FIG. 1, a data processing system is diagrammatically shown. The system 10 comprises a memory 11 for storing images, for example an optical memory having a number of optical disks. The system 10 further comprises a document scanner 12 for digitizing images prior to storage, a workstation 13 having a visual display unit (VDU) 14 and an input peripheral, such as a keyboard 15. Communication between, and control of the workstation, the scanner and the memory is performed with a processor 16. The system may be small, the workstation and the processor together forming a personal computer or PC, or it may be a large system with several scanners, a large number of workstations and a mainframe computer as the central processor.

An operator using the data processing system 10 enters documents in the system by digitizing the pages of such documents with the scanner 12. Digitization occurs by dividing each page in a large number of pixels and assigning to each pixel a value "white" or "black". Grey-levels can be simulated by assigning alternatively white and black to adjacent pixels, whereby the relative frequency of white and black depends on the shade in the original image. Scanners with a resolution of 8 or 12 pixels per millimeter are commercially available and, for example, applied in facsimile machines. Other ways of entering documents comprise sending documents in previously digitized form via electronic channels, such as telephone lines, not shown, from other processing systems, or reading digitized images from magnetic or optical record carriers. In the data processing system 10 the documents are logically connected in files. Each file representing one set of associated data, for example, in an insurance company one file may comprise all documents related to one client or one insured object.

A person handling such a file, often needs to grasp quickly the kind of file and whether or not certain documents are in that file. Stepping through all pages in a file is cumbersome and time consuming, in particular when a file may contain several tens or hundreds of pages. For that reason the simultaneous display of a large number of pages on the VDU 14 is desirable.

To this end the processor 16 comprises image reduction means 17 which reduces the original digitized images to images which are sufficiently reduced to place more then one-hundred of those reduced images of A4 sized pages simultaneously on one VDU. A suitable sized VDU is a so-called "Megapixel-screen" with a raster of 1140×860 pixels. The image reduction means 17 may be software controlled and be a program running on the same computer which controls the system, or it may comprise a dedicated arrangement for this purpose. Images can be reduced every time it is required that a reduced image is displayed. However, in view of the limited amount of storage required for reduced images and the amount of time needed to reduce a large number of images, preferably images are reduced only once, for example immediately after scanning, and stored together with the full image.

According to an embodiment of the invention the image reduction means comprises two steps. In the first step an intermediate image is generated, reduced with a factor of 400, or linearly with a factor of 20, relative to the original image or set of pixels. The second step consists of a further reduction with a factor of nine, or three linearly. These numbers are given as an example and other values can be chosen as well.

The first step encompasses a run length algorithm. This algorithm is illustrated in FIG. 2. In vertical direction the reduction is performed simply by selecting every F'th row of pixels, where F is the linear reduction factor. So only row numbers F, 2F, 3F, etc. are selected, in the Figure the F'th row 21 is shown as a selected row. Within each of these selected rows the horizontal positions $p_1, p_2, p_3, \ldots, p_n$, of the transition points are determined, i.e. those points where a black and a white pixel are adjacent, providing an array 22 of transition points $p_i$. Subsequently these numbers $p_i$ are divided by the linear reduction factor F resulting in intermediate transition value array 23 with values $q_i=p_i/F$. The values $q_i$ are rounded to an integer and provide at those positions in the intermediate rows 24 the same black/white or white/black transitions as occur in the corresponding positions $p_i$ of the original set of pixels.

Possible variations to this procedure are, for example, projection of several rows of pixels before determining the positions of the transitions points $p_i$. In that case the transition points are determined in an artificial row that is constructed by assigning black to a pixel therein when a pixel on the corresponding position in any of a selected set of rows is black, or where the number of black pixels on the corresponding positions exceeds a certain threshold. When several intermediate transition points $q_i$ fall within one pixel of the intermediate row, several methods are conceivable to provide a colour assignment. For example, a simple majority of black or white could determine the pixel colour. As an alternative, the values of the surrounding pixels could be taken into account as well. As a variation to the intermediate image reduction step, mutually different horizontal and vertical reduction factors can be used.

The second step is illustrated in FIG. 3. In this Figure a block of pixels 30 of three by three from an intermediate image is shown. The pixels are labelled 1 to 9, from upper left to lower right. Each of the nine pixels can be either white or black. In the shown configuration the pixels 2, 6, 7 and 8 are black. For each configuration of black and white pixels a connectivity is calculated, expressed as a number which represents the rate in which the black (or white) pixels are adjacent to each other. Connectivity can be calculated in various ways, resulting in different values and consequently slightly different grey level assignments for the corresponding pixel in the reduced image.

As an example, the connectivity can be defined by counting the number of times a pair of black pixels meet in a corner. According to this scheme a corner in which only two black pixels meet contributes one to the connectivity, a corner where three black pixels meet contributes three and a corner where four pixels meet, contributes six to the connectivity. Maximum connectivity in a three by three block is then 32. According to this scheme, the configuration shown in FIG. 3 has a connectivity of four. Broken down in contributions, the corners 31 where pixels 2 and 6 meet, and 32 where pixels 6 and 8 meet each contribute one. Further there are two corners 33 and 34 where pixels 7 and 8 meet which gives a further contribution of two.

The following table is used to assign grey levels in a display where each pixel may have 16 grey levels ranging from 0 (white) to 15 (black) to the resulting pixel in the reduced image. According to this table the pixel 35, replacing in the reduced image the block of FIG. 3, will be assigned a grey level of 4.

| Nr of black pixels | Conn. | Grey value | Nr of black pixels | Conn. | Grey value | Nr of black pixels | Conn. | Grey value |
|---|---|---|---|---|---|---|---|---|
| 0 | 0 | 0 | 4 | 7 | 6 | 6 | 12 | 11 |
| 1 | 0 | 0 | 4 | 8 | 6 | 6 | 13 | 11 |
| 2 | 1 | 1 | 4 | 10 | 7 | 6 | 14 | 11 |
| 2 | 2 | 2 | 5 | 4 | 7 | 6 | 16 | 12 |
| 3 | 0 | 1 | 5 | 5 | 6 | 6 | 17 | 12 |
| 3 | 1 | 1 | 5 | 6 | 6 | 6 | 18 | 13 |
| 3 | 2 | 2 | 5 | 7 | 7 | 7 | 14 | 13 |
| 3 | 3 | 2 | 5 | 8 | 7 | 7 | 16 | 14 |
| 3 | 4 | 3 | 5 | 9 | 8 | 7 | 17 | 14 |
| 3 | 5 | 3 | 5 | 10 | 9 | 7 | 19 | 14 |
| 4 | 0 | 2 | 5 | 11 | 9 | 7 | 21 | 15 |
| 4 | 2 | 2 | 5 | 12 | 10 | 7 | 22 | 15 |
| 4 | 3 | 3 | 5 | 13 | 12 | 8 | 20 | 15 |
| 4 | 4 | 4 | 6 | 8 | 11 | 8 | 24 | 15 |
| 4 | 5 | 4 | 6 | 9 | 10 | 8 | 27 | 15 |
| 4 | 6 | 5 | 6 | 10 | 10 | 9 | 32 | 15 |

Alternatively, the grey level can be assigned only to the level of connectivity, not to the combination of connectivity and number of black pixels.

For fast execution in a processor the procedure can be implemented by using a look-up table and a unique identification of each possible black/white configuration as one of 512 possible different numbers. Number assignment is, for example, a summation of the black pixels with weights $2^{i-1}$, where i is the pixel number in the labelling as given before and runs over all black pixels. The configuration shown in FIG. 3 is then number 226 ($=2^1+2^5+2^6+2^7$).

Other connectivity assignments are possible. In the example given above, sharing an edge has a weight of two, sharing a corner a weight of one. However, different weights can be assigned to the contribution of pairs of pixels sharing edges and corners.

Alternatively, not only the "black" connectivity as defined above could be taken into account, but also the "white" connectivity. The "white" connectivity is defined similar to the "black" connectivity but using the white pixels. For the configuration shown in FIG. 3 the "white" connectivity is 7.

Apart from a three by three block a similar reduction can be performed on larger blocks, for example a block of four by four, or, in combination with different vertical and horizontal reduction in the first step, a rectangular block of, for example, three by four. The size of the block is mainly restricted by the amount of time needed to calculate the connectivity and/or by the size of the look-up table needed for storing all possible configurations of black and white pixels.

FIG. 4 shows a screen on which several documents are represented with their size reduced following the method according to the invention. The original of each of the pages shown is A4 format (29.7×21 cm) and digitized into an original image of 2480 by 3507 pixels using a scanner with a resolution of 11.8 dots/mm (300 dots/inch). Using the two-step method above, the images are reduced with a factor of sixty, both horizontally and vertically. The resulting images of 41 by 58 pixels, each pixel having a grey value is shown the Figure. On a screen with about 3 rasterpoints per mm (75 points/inch) the size is approximately that of a postage stamp (about 1½×2 cm). From such a reduced size image, the type of document can easily be recognized and a large number of such reduced images can be shown simultaneously, providing the person handling the file with a quick and useful glance of the file contents.

In an embodiment of the workstation according to the invention, the operator is able to select subsets of the documents shown, and to provide logical links between them. In that case the file-image, consisting out of a number of page images, can be tailored to the users wishes and needs.

What is claimed is:

1. A data processing system which includes a raster-type visual display unit having a plurality of raster-points for displaying a reduced image of an original image, said original image representing an electronic document including information content positioned in a predetermined layout, the reduced image including a plurality of pixels, a specific one of the raster-points of the visual display unit corresponding to a specific one of the pixels of the reduced image and being adjustable for displaying one of a plurality of grey levels or one of a plurality of colors, the system comprising:

processing means for receiving the original image;

first image reduction means for generating an intermediate image from the original image by performing run length coding on the original image; and second image reduction means for receiving the intermediate image from the processing means and for generating the reduced image by representing a block of pixels of the intermediate image by a single pixel in the reduced image through assignment of one of a variety of grey levels or of a variety of colors to the single pixel of the reduced image based on a connectivity value of the block of pixels of the intermediate image, wherein the connectivity value is an integer representing the number of connected black pixel corners in the block of pixels of the intermediate image;

the processing means being operative to receive the reduced image from the second image reduction means and to relay the reduced image to the visual display unit;

the visual display unit being operative to selectively display the original image or the reduced image.

2. The data processing system of claim 1, wherein the second reduction means includes using a look-up table indexed according to the connectivity values for determining one of the grey level and color of the single pixel in the reduced image from the block of pixels in the intermediate image.

3. The data processing system of claim 1, wherein the second reduction means reduces a block of three by three pixels in the intermediate image into the single pixel in the reduced image.

4. The data processing system of claim 2, wherein the look-up table is additionally indexed according to a number of black pixels in the block of pixels in the intermediate image.

5. The data processing system of claim 1, wherein the first reduction means generates the intermediate image which is reduced by a linear factor of twenty relative to the original image.

6. A method for generating a reduced image from an original image, the original image being representative of an electronic document including information content positioned in a predetermined layout, the method including the steps of:

generating an intermediate image from the original image by performing run length coding on the original image;

generating the reduced image so that the information content is not recognizable and the layout is recognizable by representing a block of pixels in the intermediate image by a single pixel in the reduced image;

assigning one of a variety of grey levels or one of a variety of color values to the single pixel of the reduced image based on a connectivity value of the block of pixels of the intermediate image, wherein the connectivity value is an integer representing the number of connected black pixel corners in the block of pixels of the intermediate image; and displaying one of the reduced image and the original image on the visual display unit.

7. The method of claim 6, wherein the step of generating the reduced image includes using a look-up table indexed according to the connectivity values for determining one of the grey level and color of the single pixel in the reduced image from the block of pixels in the intermediate image.

8. A method of displaying a file on a raster-type visual display unit, the file including a plurality of source pages, wherein a plurality of reduced pages, a respective one of the plurality of the reduced pages corresponding to a respective one of the plurality of source pages of the file, are simultaneously displayed on the visual display unit, the method comprising the steps of:

generating a specific one of the reduced pages by first generating an intermediate image from the source page by performing run length coding on the source page and by representing a block of pixels of the intermediate image by a single pixel in the specific reduced page;

assigning one of a variety of grey levels or of a variety of colors to the single pixel of the reduced page based on a connectivity value of the block of pixels of the intermediate image, wherein the connectivity value is an integer representing the number of connected black pixel corners in the block of pixels of the intermediate image; and displaying each of the reduced pages simultaneously.

* * * * *